(12) United States Patent
Gururaj

(10) Patent No.: US 8,312,322 B2
(45) Date of Patent: Nov. 13, 2012

(54) SYSTEM FOR AUTOMATED GENERATION OF COMPUTER TEST PROCEDURES

(75) Inventor: Rajesh Gururaj, Schaumburg, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 285 days.

(21) Appl. No.: 12/833,021

(22) Filed: Jul. 9, 2010

(65) Prior Publication Data

US 2011/0113287 A1 May 12, 2011

Related U.S. Application Data

(60) Provisional application No. 61/260,421, filed on Nov. 12, 2009.

(51) Int. Cl.
*G06F 11/00* (2006.01)
(52) U.S. Cl. .......................................................... 714/25
(58) Field of Classification Search .................... 714/25, 714/37
See application file for complete search history.

(56) References Cited

U.S. PATENT DOCUMENTS

| | | | |
|---|---|---|---|
| 5,157,779 A * | 10/1992 | Washburn et al. ............... | 714/37 |
| 5,565,316 A | 10/1996 | Kershaw et al. | |
| 5,640,537 A | 6/1997 | Jessen et al. | |
| 5,827,070 A | 10/1998 | Kershaw et al. | |
| 6,002,869 A * | 12/1999 | Hinckley ....................... | 717/124 |
| 6,029,257 A | 2/2000 | Palmer | |
| 7,039,912 B1 | 5/2006 | Moulden, Jr. et al. | |
| 7,343,587 B2 | 3/2008 | Moulden, Jr. et al. | |
| 7,516,362 B2 | 4/2009 | Connelly et al. | |
| 7,836,346 B1 * | 11/2010 | Davidov et al. ............... | 714/38.1 |
| 2005/0257086 A1 * | 11/2005 | Triou et al. ..................... | 714/25 |
| 2006/0036907 A1 | 2/2006 | Inscoe et al. | |
| 2006/0206870 A1 | 9/2006 | Moulden et al. | |
| 2007/0028216 A1 | 2/2007 | Boss et al. | |
| 2007/0255579 A1 * | 11/2007 | Boland et al. ..................... | 705/1 |
| 2008/0215931 A1 | 9/2008 | Boss et al. | |

* cited by examiner

*Primary Examiner* — Scott Baderman
*Assistant Examiner* — Yair Leibovich
(74) *Attorney, Agent, or Firm* — Alexander J Burke

(57) ABSTRACT

A system automatically generates a workflow report for computerized system testing and other uses. The system comprises at least one processing device including at least one log file including records identifying time stamped actions performed by a user of a computerized processing system and actions performed by the system. A repository includes stored predetermined data patterns associated with workflow tasks performed in a workflow by a user and a system. A parser automatically parses records of the at least one log file to identify workflow tasks performed during a time period using the predetermined data patterns. A report generator automatically generates a workflow report comprising the identified workflow tasks and associated time stamps indicating workflow tasks performed by the system and user during the time period. An output processor provides the generated workflow report to a destination device for access by a user.

15 Claims, 8 Drawing Sheets

```
Parse Result:

Siemens    Siemens Artis
6:56:12    PP Active
6:56:13    PP NotActive
7:56:42    ECC(AMC) SEL_SS
8:58:00    ECC(AMC) SEL_EXAM_SET
8:58:06    ECC(AMC) SEL_PROGRAM
           ECC(AMC)
8:58:06    SEL_FRAME_RATE
8:59:53    ECC(AMC) SEL_SS
9:00:00    Exam Fluoro Plane-A
9:00:06    Exam Fluoro Plane-A
9:20:35    Exam Fluoro Plane-A
9:21:44    Exam Fluoro Plane-A
           Exam Acq(DSA_SUB) Plane-
9:22:14    A
9:23:12    Exam Fluoro Plane-A
9:23:18    Exam Fluoro Plane-A
9:23:38    Exam Fluoro Plane-A
9:23:43    Exam Fluoro Plane-A
9:23:48    ECC(AMC) SEL_PROGRAM
9:23:49    ECC(AMC) SEL_PROGRAM
           Exam Acq(DSA_SUB) Plane-
9:24:04    A
9:24:41    ECC(AMC) SEL_EXAM_SET
9:25:27    Exam Fluoro Plane-A
           Exam Acq(DSA_SUB) Plane-
9:25:48    A
9:26:20    PP Active
9:26:39    PP Single Step Fwd
9:26:41    PP Single Step Fwd
9:26:48    Exam Fluoro Plane-A
           Exam Acq(DSA_SUB) Plane-
9:27:20    A
9:28:26    Exam Fluoro Plane-A
9:28:51    Exam Fluoro Plane-A
           Exam Acq(DSA_SUB) Plane-
9:29:08    A
9:29:39    PP Single Step Fwd
9:29:46    PP Pshift
9:29:47    PP PShift Flex
9:30:17    ECC Joystick Step Forward
```

ErrorHandlingServer 04588     06:55:25.921
CErrorHandlingServerDoc::CErrorHandlingServerDoc() - DONE - Server Start = 06:55:25.859 End = 06:55:25.921 - 63ms ErrorHandlingServer 04588     06:55:26.031 NON-UI Version of
ErrorHandlingServer SSMSyngoInterface 04764     06:55:26.078 CLIENT ATTACHED SSMSyngoInterface 04764 005376 06:55:25.625 CSSMSyngoIntf::open - Elapsed 42 usec - CommandLine=C:\AXIOM\bin\CsaGenericMain.exe /System=IVS /Process=StateManager /Starter=Syngo
  SSMSyngoInterface 04764 005376 06:55:25.625 CSSMSyngoIntf::open - Elapsed 43 usec - Windows has been up for 0:0:4:4 (d:h:m:s)
  SSMSyngoInterface 04764 004164 06:55:26.031 CCfg::CreateInstance - Elapsed 305075 usec - The Component in which Configuration resides may not be PSM compliant.. Please check
  SSMSyngoInterface 04764 004164 06:55:26.031 CCfg::ReadCafFile - CCfg::ReadCafFile
  SSMSyngoInterface 04764 004164 06:55:26.109 CSSMThread::OnUserMessage - Elapsed 370241 usec - Waiting for SystemStateManager to appear in the ROT.

AxGenericMain 02884     06:55:26.312 CLIENT ATTACHED

AxGenericMain 02884 006104 06:55:26.296 CHANGED COMPONENT NAME from AxGenericMain to StateManager StateManager 02884 006104 06:55:26.296 CAxGenericMainApp::InitInstance - Elapsed 170 usec - CmdLine = 'C:\AXIOM\axis\AxGenericMain.exe /Starter=Syngo /Process=StateManager /SystemType=IVS /System=IVS /DumpType=5'
    StateManager 02884 006104 06:55:26.671 CPMMonitorThread::LoadComponents - Elapsed 354535 usec - Component loading completed
    StateManager 02884 006104 06:55:26.671 CClientThread::LocateClients - Elapsed 22 usec - 3 clients detected RemoteEventDistribu 03780     06:55:26.781 CLIENT ATTACHED StateManager 02884 006104 06:55:26.796 EvtDist Client Registered : StateObjects [ 1 ]

FIGURE 6

Parse Result :

| | |
|---|---|
| Siemens | Siemens Artis |
| 6:56:12 | PP Active |
| 6:56:13 | PP NotActive |
| 7:56:42 | ECC(AMC) SEL_SS |
| 8:58:00 | ECC(AMC) SEL_EXAM_SET |
| 8:58:06 | ECC(AMC) SEL_PROGRAM |
| 8:58:06 | ECC(AMC) SEL_FRAME_RATE |
| 8:59:53 | ECC(AMC) SEL_SS |
| 9:00:00 | Exam Fluoro Plane-A |
| 9:00:06 | Exam Fluoro Plane-A |
| 9:20:35 | Exam Fluoro Plane-A |
| 9:21:44 | Exam Fluoro Plane-A |
| 9:22:14 | Exam Acq(DSA_SUB) Plane-A |
| 9:23:12 | Exam Fluoro Plane-A |
| 9:23:18 | Exam Fluoro Plane-A |
| 9:23:38 | Exam Fluoro Plane-A |
| 9:23:43 | Exam Fluoro Plane-A |
| 9:23:48 | ECC(AMC) SEL_PROGRAM |
| 9:23:49 | ECC(AMC) SEL_PROGRAM |
| 9:24:04 | Exam Acq(DSA_SUB) Plane-A |
| 9:24:41 | ECC(AMC) SEL_EXAM_SET |
| 9:25:27 | Exam Fluoro Plane-A |
| 9:25:48 | Exam Acq(DSA_SUB) Plane-A |
| 9:26:20 | PP Active |
| 9:26:39 | PP Single Step Fwd |
| 9:26:41 | PP Single Step Fwd |
| 9:26:48 | Exam Fluoro Plane-A |
| 9:27:25 | Exam Acq(DSA_SUB) Plane-A |
| 9:28:26 | Exam Fluoro Plane-A |
| 9:28:51 | Exam Fluoro Plane-A |
| 9:29:08 | Exam Acq(DSA_SUB) Plane-A |
| 9:29:39 | PP Single Step Fwd |
| 9:29:46 | PP Pshift |
| 9:29:47 | PP PShift Flex |
| 9:30:17 | ECC Joystick Step Forward |

FIGURE 7

```
'version.vbs
'<package>
'<job>
'<script language="VBScript">
Dim oShell
Set oShell = CreateObject("Wscript.Shell")
oShell.run "PP Active.exe"
oShell.run "PP NotActive.exe"
oShell.run "ECC(AMC) SEL_SS.exe"
oShell.run "ECC(AMC) SEL_EXAM_SET.exe"
oShell.run "ECC(AMC) SEL_PROGRAM.exe"
oShell.run "ECC(AMC) SEL_FRAME_RATE.exe"
oShell.run "ECC(AMC) SEL_SS.exe"
oShell.run "Exam Fluoro Plane-A.exe"
oShell.run "Exam Fluoro Plane-A.exe"
oShell.run "Exam Acq(DSA_SUB) Plane-A.exe"
oShell.run "Exam Fluoro Plane-A.exe"
oShell.run "ECC(AMC) SEL_PROGRAM.exe"
oShell.run "ECC(AMC) SEL_PROGRAM.exe"
oShell.run "Exam Acq(DSA_SUB) Plane-A.exe"
oShell.run "ECC(AMC) SEL_EXAM_SET.exe"
oShell.run "Exam Fluoro Plane-A.exe"
oShell.run "Exam Acq(DSA_SUB) Plane-A.exe"
oShell.run "PP Active.exe"
oShell.run "PP Single Step Fwd.exe"
oShell.run "Exam Fluoro Plane-A.exe"
oShell.run "Exam Acq(DSA_SUB) Plane-A.exe"
oShell.run "Exam Fluoro Plane-A.exe"
oShell.run "Exam Fluoro Plane-A.exe"
oShell.run "Exam Acq(DSA_SUB) Plane-A.exe"
oShell.run "PP Single Step Fwd.exe"
oShell.run "PP Pshift.exe"
oShell.run "PP PShift Flex.exe"
oShell.run "ECC Joystick Step Forward.exe"
oShell.run "ECC PIXELSHIFT.exe"
oShell.run "Exam Fluoro Plane-A.exe"
oShell.run "Exam Acq(DSA_SUB) Plane-A.exe"
oShell.run "Exam Fluoro Plane-A.exe"
oShell.run "Exam Acq(DSA_SUB) Plane-A.exe"
oShell.run "ECC Joystick Step Forward.exe"
oShell.run "ECC Joystick Step Backward.exe"
oShell.run "ECC Joystick Step Forward.exe"
oShell.run "Exam Fluoro Plane-A.exe"
oShell.run "Exam Acq(DSA_SUB) Plane-A.exe"
set oShell = nothing
WScript.Quit
```

SYSTEM FOR AUTOMATED GENERATION OF COMPUTER TEST PROCEDURES

This is a non-provisional application of provisional application Ser. No. 61/260,421 filed Nov. 12, 2009, by R. Gururaj.

FIELD OF THE INVENTION

This invention concerns a system for automatically generating a workflow report for testing of a computerized system by parsing a log file of time stamped actions performed by a user of a computerized processing system and actions performed by the system to identify predetermined data patterns and associated workflow tasks performed during a time period.

BACKGROUND OF THE INVENTION

Known deployed data processing systems are analyzed for errors during operation by parsing through error field logs of the systems. Log files contain the history of actions occurring during an error condition and provide detailed information about the state of the system and particular errors. The error logging function captures errors occurring when the system is in use, but typically fails to capture actions which are responsible for the error.

The absence of information indicating actions which are responsible for an error obscures how the error happened. Such errors are consequently not reproducible on a reasonable time schedule. This increases time required to fix problems in the system and such delay affects user perception of system quality and reliability. Further, some errors remain undetected when the system does not enter an unusable state and the system is assumed to be running as expected which tends to make the system unstable. A system according to invention principles addresses these deficiencies and related problems.

SUMMARY OF THE INVENTION

A system provides a means to expedite locating software and other defects in a field deployed data processing system by automatically reproducing a user and system workflow. A system automatically generates a workflow report for computerized system testing and other uses. The system comprises at least one processing device including at least one log file including records identifying time stamped actions performed by a user of a computerized processing system and actions performed by the system. A repository includes stored predetermined data patterns associated with workflow tasks performed in a workflow by a user and a system. A parser automatically parses records of the at least one log file to identify workflow tasks performed during a time period using the predetermined data patterns. A report generator automatically generates a workflow report comprising the identified workflow tasks and associated time stamps indicating workflow tasks performed by the system and user during the time period. An output processor provides the generated workflow report to a destination device for access by a user.

BRIEF DESCRIPTION OF THE DRAWING

FIG. 5 illustrates a portion of a log file, according to invention principles.

FIG. 6 illustrates a portion of generated workflow report, according to invention principles.

FIG. 7 illustrates a portion of a generated test script file, according to invention principles.

DETAILED DESCRIPTION OF THE INVENTION

In software systems containing large number of features, there arises a high possibility of the system being used in an alternate workflow. Testing possible workflows on schedule and on budget is difficult without significantly lengthening a software development life cycle, increasing development costs or both. An untested workflow may hide software defects which are subsequently triggered in response to user operation. The economic impact from these defects is high and for mission critical applications, these software defects can cause serious damage to direct and indirect users and business. A system expedites location of such defects in the field by automatically reproducing the field workflow.

In order to determine a workflow of a system, it is necessary to capture the User and System actions which are responsible far bringing the system into an erroneous state. These actions are captured by writing time stamped records identifying the user and data processing system actions performed into a log file in a readable format. This provides data indicating step by step operations performed on the data processing system which result in an unexpected state. The operations that are identified in the log file are automatically parsed and reproduced in a testing environment to test the system based on its usage and to correct errors. The system automates this process to reduce the time taken to understand the behavior of a data processing system and its operating environment and status at the time of an error. A user is able to replicate the error scenario in a shorter period of time and to have an improved understanding of what happened in the data processing system. This reduction in time for capturing and analyzing errors from a large group of users having different security levels, expedites software fixes. In response to a fix being determined for a particular error, the system generates a test script that is used to automatically validate the fix and improve the quality of a fix. The generated test scripts are adaptively selected for testing fixes which improves the efficiency and quality of testing.

Figure 1:
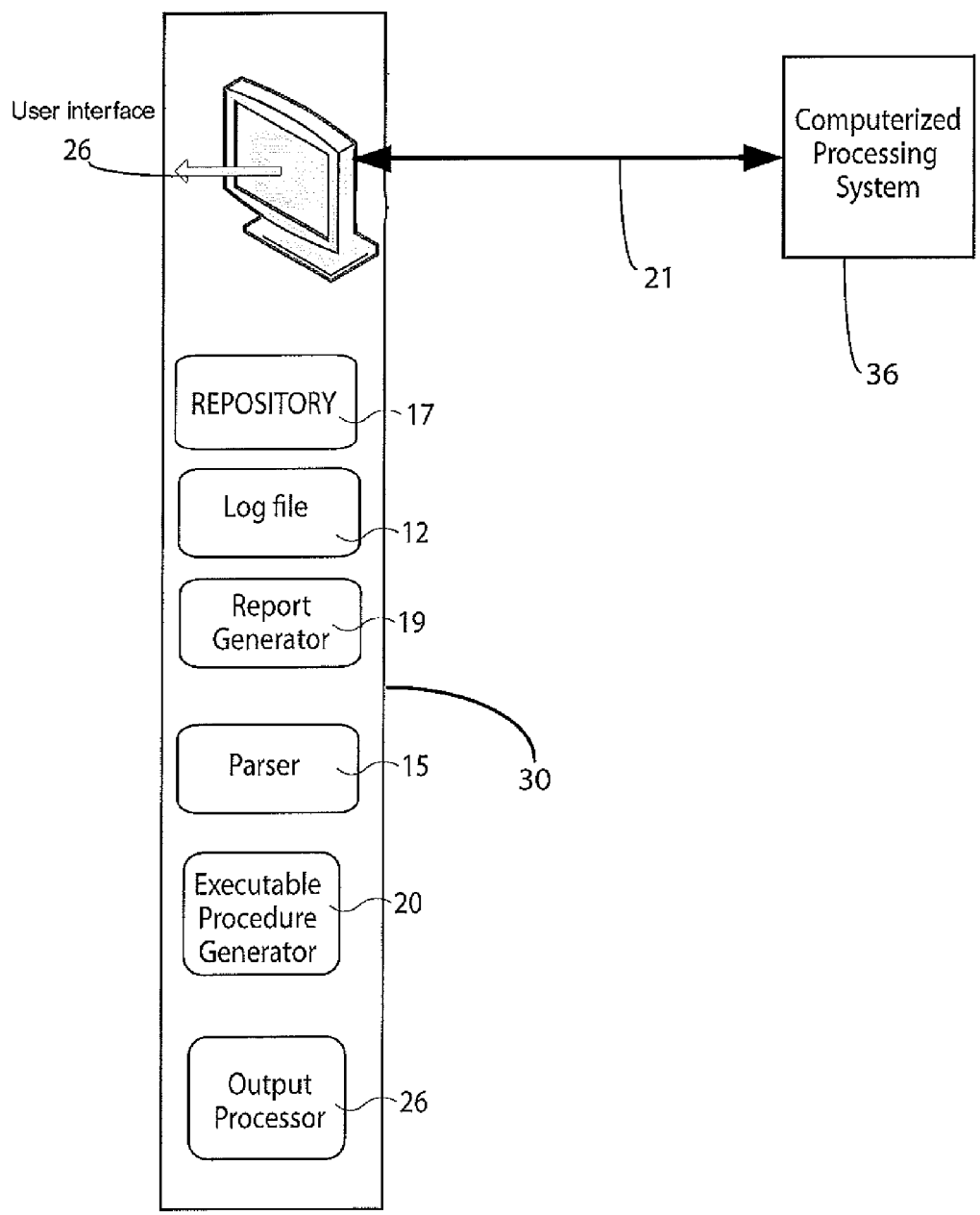
FIG. 1 shows a system for automatically generating a workflow report for computerized system testing and other uses, according to invention principles.

FIG. 1 shows system 10 for automatically generating a workflow report for computerized system testing and other uses. System 10 comprises at least one computer system, workstation, server or other processing device 30 including at least one log file 12, repository 17, parser 15, report generator 19, output processor 26, executable procedure (e.g., test script) generator 20 and a user interface 26. Device 30 communicates via network 21 with computerized processing system 36 and monitors errors and tests and fixes computerized processing system 36. In other embodiments system 10 may reside on processing system 36 or may be distributed on one or more devices communicating via network 21. The at least one log file 12 includes data identifying time stamped actions performed by a user of computerized processing system 36 and actions performed by computerized processing system 36. Repository 17 stores predetermined data patterns associated with workflow tasks performed in a workflow by a user and computerized processing system 36.

Parser 15 automatically parses records of the at least one log file 12 to identify workflow tasks performed during a time period using the predetermined data patterns. Report generator 19 automatically generates a workflow report comprising the identified workflow tasks and associated time stamps indicating workflow tasks performed by computerized processing system 36 and the user during the time period. Executable procedure generator 20 automatically generates a computer system environment substantially replicating a computer system environment occurring during performance of the workflow tasks by the user and computerized processing system 36 by associating executable procedures with corresponding workflow tasks in the workflow report and by initiating execution of the executable procedures. Output processor 26 provides the generated workflow report to a destination device for access by a user.

Figure 2:
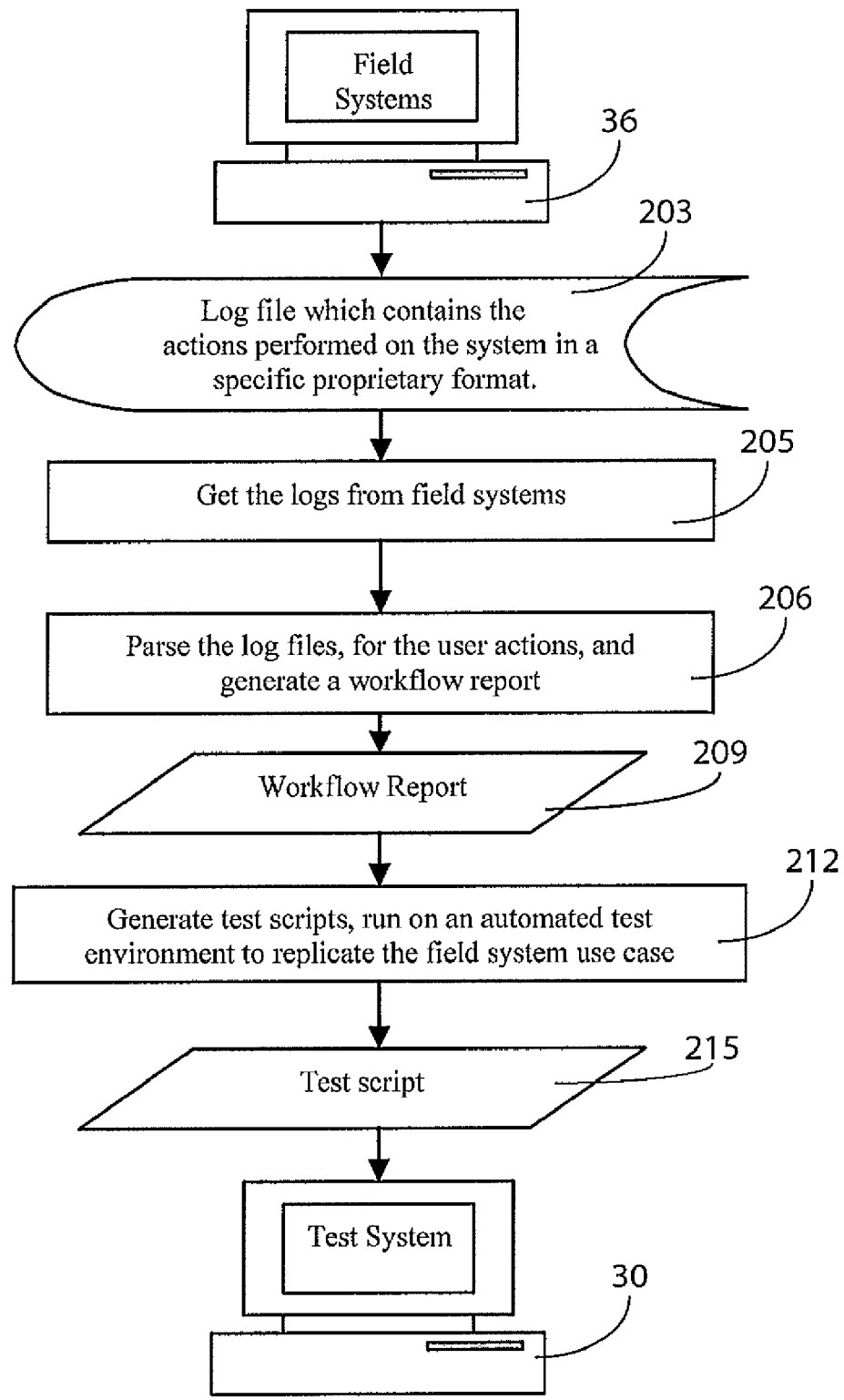
FIG. 2 shows a flowchart of a process for computerized system testing, according to invention principles.

FIG. 2 shows a flowchart of a process for computerized system testing. In step 203 system 10 (FIG. 1) captures user and computerized processing system 36 time stamped actions by recording data identifying the actions in log file 12 in a pattern which may be a proprietary log file record format or an XML file, for example. The log file record format for recording actions comprises <Process Name>_<Process ID>_<Thread ID>_<Time of occurrence hh:mm:ss> and <Message describing the action>, for example. FIG. 5 illustrates a portion of a log file. The greater the detail captured concerning the actions, the closer the test environment concerning an error is replicated and the nearer is the replication of the workflow associated with the error to the actual workflow involved in the error in field deployed computerized processing system 36. For instance, log files 12 record a device name of an input-output (IO) device employed by a user, specific points or interfaces of the device in use and data identifying a user interaction specific to the software employed such as button clicks or a drop down selections.

In step 205, the recorded log file data is automatically acquired from log files 12 stored within processing system 36 (or stored remotely in another embodiment). In step 206, parser 15 processes recorded data in one or more log files 12 having a specific log file record format and identifying system 36 actions and associated user actions and generates a workflow report for each log file. Parser 15 is configured to parse log files having the predetermined specific log file record format and organizes errors identified in log files 12 based on several factors including severity and subsystem identity. The recorded log file data is acquired from log files 12 and analyzed by parser 15 to determine behavior of computerized processing system 36 and an associated use case indicating operating context and environment substantially encompassing the time of an error. Report generator 19 automatically generates a workflow report 209 comprising identified workflow tasks and associated time stamps indicating workflow tasks performed by the system and the user during a time period. In step 212, a generated workflow report is input via output processor 26 to an executable procedure (e.g., test script) generator 20 to generate test scripts 215 which are executed in an automated test environment to replicate an error environment and context case. Generator 20 automatically generates a computer system context and environment substantially replicating a computer system environment occurring during performance of the workflow tasks by a user and processing system 36 by associating executable procedures with corresponding workflow tasks in the workflow report and by initiating execution of the executable procedures. A generated procedure comprises an automated script, for example, replicating user actions and system 36 actions and reproduces errors which need to be addressed by test system 30.

A test unit may have logging turned on at a higher level than deployed computerized processing system 36 and record additional messages to provide detail of the working of processing system 36. This cannot be done in a field deployed system without excessive use of storage, reduced system response time and impaired processing system performance. System 10 advantageously reproduces a system context and environment using an automated script without excessively burdening data processing system 36. System 10 continuously monitors and analyzes log files 12 which go unnoticed in the field, thus improving the quality of the system and making it more robust. System 10 reduces time taken to analyze and fix errors by reducing time taken to reproduce a problem and addresses errors that otherwise go unnoticed which increases confidence in fixes and tests systems more thoroughly. A generated workflow report facilitates understanding how system 36 is used based on several factors including geographical location where the product is in use and the version of the software product in use.

Figure 3:
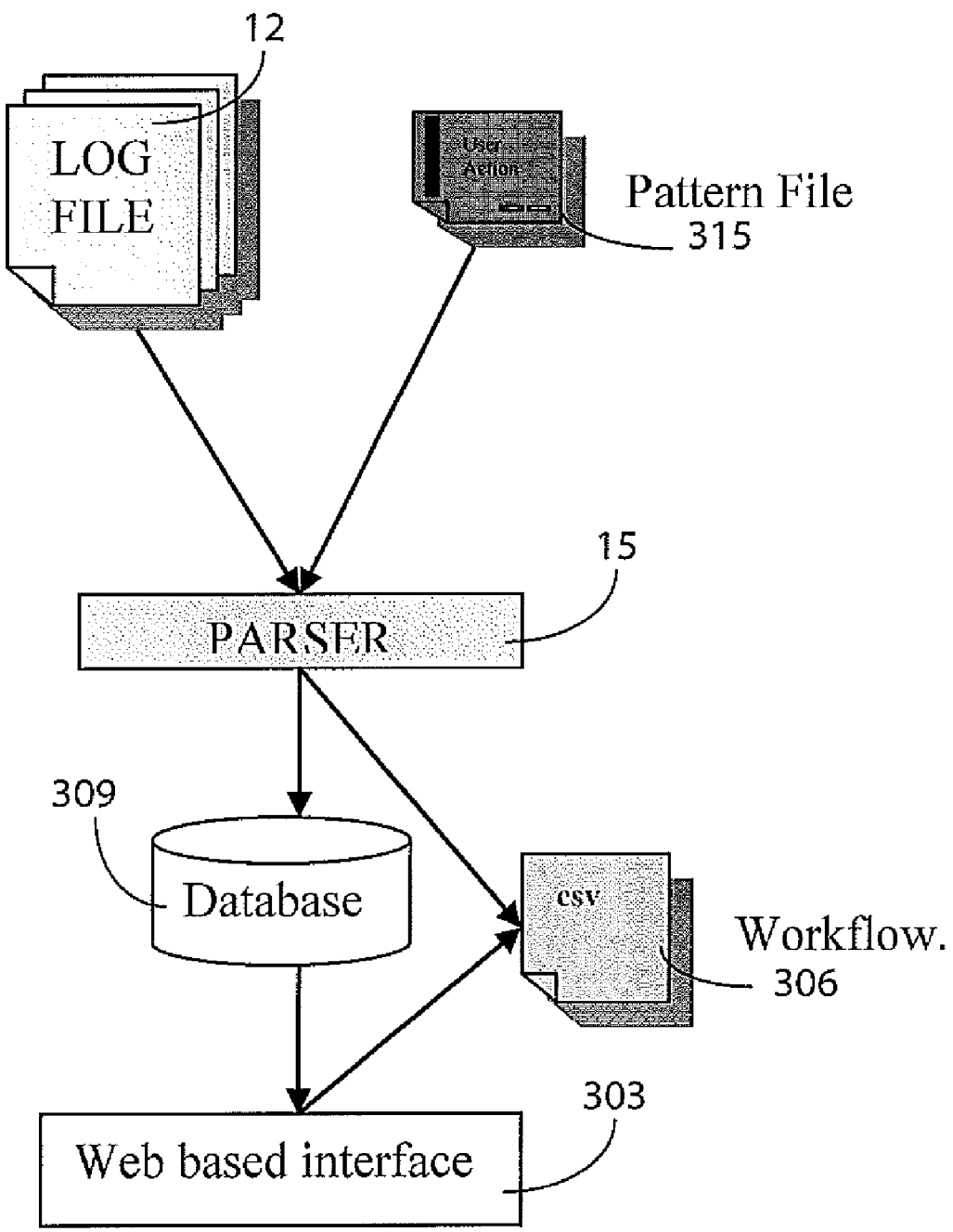
FIG. 3 shows a system for generating a workflow report, according to invention principles.

FIG. 3 shows a system for generating a workflow report. Computerized processing system 36 (FIG. 1) generates log files 12 in response to actions performed externally by the user and internal actions performed by system 36 which are logged into the log files. In one embodiment log files 12 are electronically accessed for storage and retrieval and automatically copied from computerized data processing system 36 to a centralized location periodically (e.g., daily, hourly, weekly, monthly). Log files 12 may be automatically copied via a network for use by system 10. Repository 17 includes stored predetermined data patterns 315 associated with workflow tasks performed in a workflow by a user and processing system 36 and that are used by parser 15. A predetermined data pattern 315 is a text file incorporating a list of features and keywords in the form of a keyword-label pair for use in a search. A line in data pattern 315 corresponds to a unique record to be used for text pattern search of log files 12. In one embodiment, the format of each line in the data pattern 315 comprises Log Label<TAB>Log Keyword. A Log Keyword specifies a pattern to be found in log files 12. Keywords may contain information (e.g. metadata) that is not presented to a user and keywords or patterns are associated with a user friendly Log Label that is part of a displayed structured output.

Parser 15 uses predetermined data patterns 315 to automatically search log files 12 (e.g. including the log file records of FIG. 5) to identify predetermined data patterns 315 and associated workflow tasks performed during a time period to create workflow report 306. Parser 15 parses through the log files 12, to identify data items used to generate a workflow report. The parser parses the log files stored in a centralized location or stored in one more distributed locations or locally by system 36, and the workflow report is generated. FIG. 6 illustrates a workflow report generated by parser 15 from log files 12 (e.g., including the records of FIG. 5). Parser 15 is configurable to provide results and generate a workflow report at periodic time intervals and is configurable to determine level of detail recorded for each user and system 36 action. Report generator 19 (not shown in FIG. 3 to preserve drawing clarity) automatically generates a workflow report comprising the identified workflow tasks and associated time stamps indicating workflow tasks performed by computerized processing system 36 and user during a time period. The Workflow report comprises data indicating actions performed by the user and computerized processing system 36, (specified in pattern file 315) in order of their occurrence in log files 12 that reports use of system 36. A generated workflow report is stored in database 309 (such as an SQL Server or Access database). Alternatively, the workflow report may be stored in a .csv (comma separated values) format in a file 306, for example. In one embodiment, the workflow report contains data indicating, Time of occurrence of an action, Type of action, and Description of action. Web browser 303 presented via user interface 26 enables a user to access the workflow report.

Figure 4:
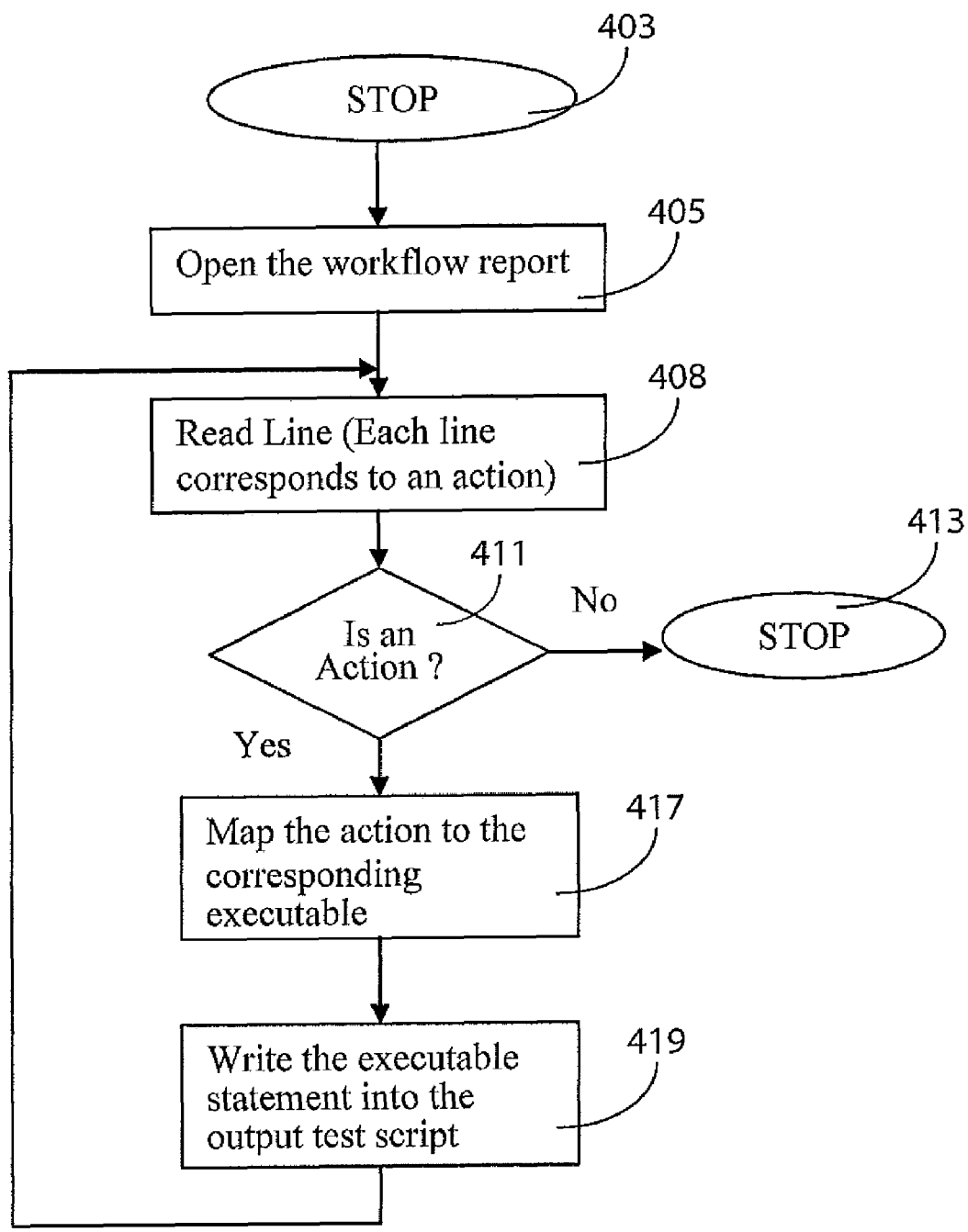
FIG. 4 shows a flowchart of a process for generating test scripts using a generated workflow report, according to invention principles.

FIG. 4 shows a flowchart of a process for generating test scripts using a generated workflow report. Executable procedure (e.g., test script) generator 20 (FIG. 1) opens a generated workflow report in step 405 following inactive state 403. The workflow report comprises data identifying user actions, such as user interface interactions (such as button clicks, menu selections), keyboard usage and mouse clicks, for example. The workflow report also includes data identifying executable software actions such as File creation, Error and Exception operations, for example. The workflow report is analyzed to identify errors or exceptions or any event which is not desirable for correct operation of computerized processing system 36 (FIG. 1). System 36 is determined to be stable if no errors, exceptions or other undesirable events are identified by the workflow report analysis.

Executable procedure generator 20 iteratively executes steps 408, 411, 413, 417 and 419. Specifically, generator 20 reads individual lines of the workflow report in step 408, determines if each line identifies an error or exception or an event requiring action in step 411 and if action is required, maps the identified action to a corresponding executable procedure in step 417 and writes the executable procedure into a test script file in step 419. If in step 411, a line does not require action, processing of the line is terminated in step 413 and processing resumes of the remaining lines in the workflow report. The test script is used for automatically generating an environment and context for computerized system 36 substantially replicating a computer system environment and context occurring during an error, exception or an event requiring action. The environment and context is replicated during performance of the workflow tasks by the user and system 36 by associating executable procedures with corresponding workflow tasks in the workflow report and by initiating execution of the executable procedures.

Errors in the workflow report are processed by executable procedure generator 20 which generates an automated test case based on the workflow report, to replicate a user and system 36 workflow, in a similar software environment such as a test environment, for example. A generated test script is executed in the test environment, to reproduce an error by following the same workflow derived from the workflow report enabling identification and fixing of an error. Executable procedure generator 20 generates a test case by associating individual actions in a workflow with an executable procedure which is executed to perform a specific action. This workflow report is analyzed to determine how the system was used for the day, and if any errors occurred. In one embodiment, in response to detection of an error, the workflow report is processed by an auto script generation unit in executable procedure generator 20 to provide a test script for execution. Individual steps in the workflow are associated with an executable procedure which performs the steps when execution occurs. The script contains commands to run the respective executable procedure, in sequence as in the workflow report. FIG. 7 illustrates a test script generated from a workflow report comprising the records of FIG. 6 and execution of the script replicates the workflow in the test environment. Executable procedure generator 20 performs a test case workflow, maps each action in the workflow to a corresponding respective executable procedure that comprise predetermined programming language statements. A programming language is selected based on test environment configuration. A generated executable procedure performs user actions on a system 36 user interface and a script is generated to perform individual user actions performable via the user interface and associated user interface display elements.

Figure 8:
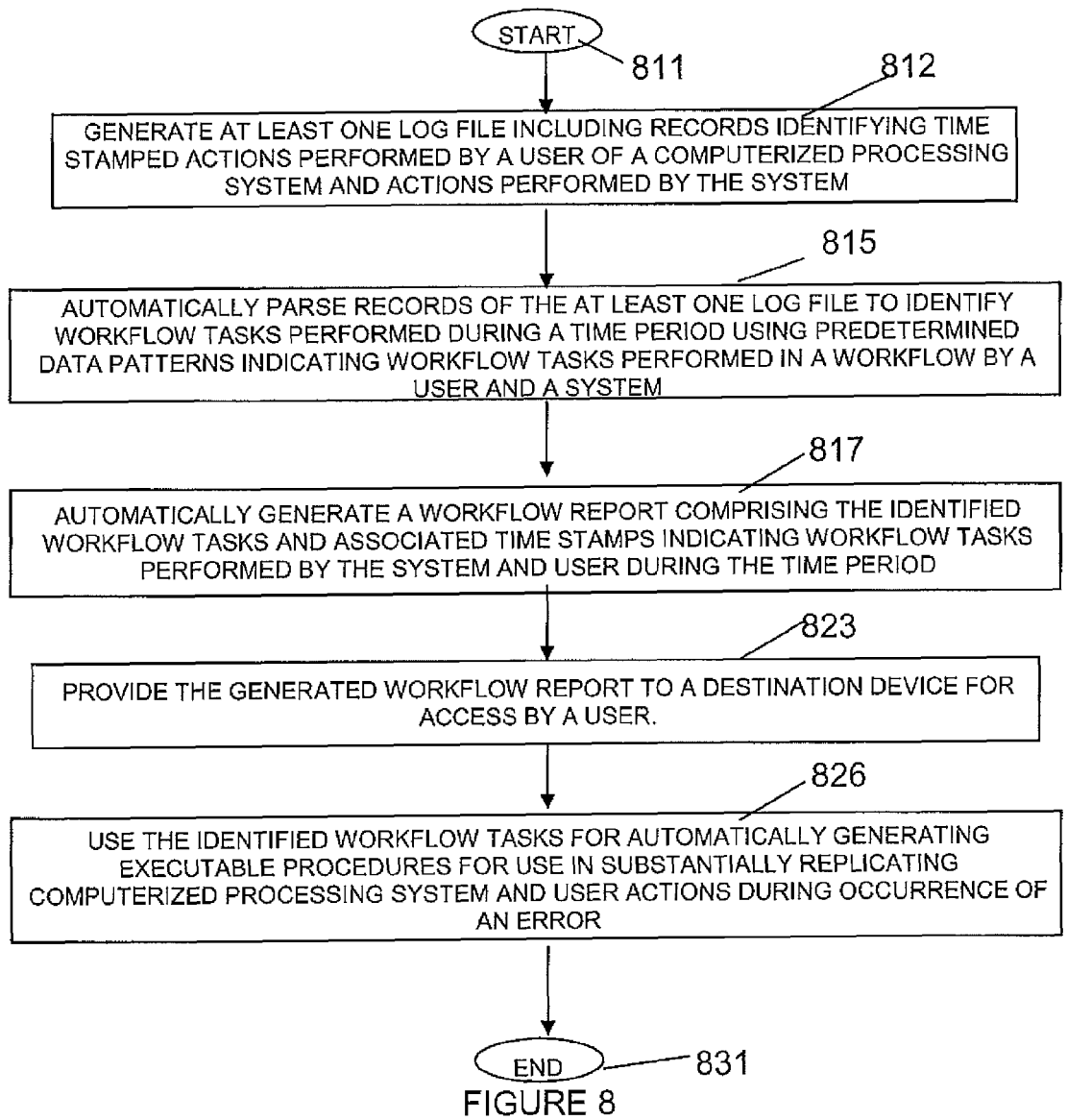
FIG. 8 shows a flowchart of a process used by a system for automatically generating a workflow report for computerized system testing and other uses, according to invention principles.

FIG. 8 shows a flowchart of a process used by system 10 for automatically generating a workflow report for computerized system testing and other uses. In step 812 following the start at step 811, system 36 (or another unit in system 10) generates at least one log file 12 including records identifying time (including date) stamped actions performed by a user of a computerized processing system and actions performed by system 36. System 36 generates at least one log file 12 including records identifying time stamped actions comprising at least two of, (a) a Process Name, (b) a Process identifier, (c) a Thread identifier, (d) a time of occurrence and (e) a Message describing an action. Parser 15 in step 815 automatically parses records of at least one log file 12 to identify workflow tasks performed during a time period using predetermined data patterns stored in repository 17 indicating workflow tasks performed in a workflow by a user and by system 36. In step 817 report generator 19 automatically generates a workflow report comprising the identified workflow tasks and associated time stamps indicating workflow tasks performed by system 36 and the user during the time period. In step 823 output processor 26 provides the generated workflow report to a destination device (executable procedure generator 20) and for access by a user.

In step 826 executable procedure generator 20 uses the identified workflow tasks for automatically generating executable procedures for use in substantially replicating computerized processing system 36 and user actions during occurrence of an error, exception or an event associated with incorrect operation of said computerized processing system. Generator 20 processes records of the workflow report for automatically generating a computer system environment substantially replicating a computer system 36 environment occurring during performance of the workflow tasks by the user and system 36 by associating executable procedures (e.g., automated test scripts) with corresponding workflow tasks in the workflow report and by initiating execution of the executable procedures. The executable procedures associated with the corresponding workflow tasks are executed in sequential order corresponding to the original order of tasks performed by the user and system 36 in the workflow report. The executable procedures associated with the corresponding workflow tasks are executed at time intervals substantially corresponding to the original time intervals between tasks performed by the user and system 36 in the workflow report. The process of FIG. 8 terminates at step 831.

A processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a controller or microprocessor, for example, and is conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters. A user interface (UI), as used herein, comprises one or more display images, generated by a user interface processor and enabling user interaction with a processor or other device and associated data acquisition and processing functions.

The UI also includes an executable procedure or executable application. The executable procedure or executable application conditions the user interface processor to generate signals representing the UI display images. These signals are supplied to a display device which displays the image for viewing by the user. The executable procedure or executable application further receives signals from user input devices, such as a keyboard, mouse, light pen, touch screen or any other means allowing a user to provide data to a processor. The processor, under control of an executable procedure or executable application, manipulates the UI display images in response to signals received from the input devices. In this way, the user interacts with the display image using the input devices, enabling user interaction with the processor or other device. The functions and process steps herein may be performed automatically or wholly or partially in response to user command. An activity (including a step) performed automatically is performed in response to executable instruction or device operation without user direct initiation of the activity.

The system and processes of FIGS. 1-8 are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. The system generates a test script that is used to replicate an error scenario and automatically validate a software fix using a workflow report derived from a log file that records time stamped system and user actions indicating step by step operations performed on a computerized data processing system which occur at the time of the error. Further, the processes and applications may, in alternative embodiments, be located on one or more (e.g., distributed) processing devices on a network linking the units of FIG. 1. Any of the functions and steps provided in FIGS. 1-8 may be implemented in hardware, software or a combination of both.

What is claimed is:

1. A system for automatically generating a workflow report for testing a computerized system and other uses, comprising:
   at least one computer including:
      at least one log file including records identifying time stamped non-test actions performed by a user of a computerized processing system and actions performed by said system;
      a repository of stored predetermined data patterns associated with workflow tasks performed in a workflow by a user and a system;
      a parser for automatically parsing records of said at least one log file to identify a sequence of time stamped workflow tasks performed during a time period encompassing an error using the predetermined data patterns;
      a report generator for automatically generating a workflow report comprising the identified workflow tasks and associated time stamps indicating non-test workflow tasks performed by the system and user during said time period in sequence; and
      an executable procedure generator for using the workflow report for generating executable procedures replicating the identified system and user non-test workflow tasks in said sequence.

2. A system according to claim 1, wherein
said executable procedure generator uses the identified workflow tasks for automatically generating executable procedures for use in substantially replicating computerized processing system and user actions during occurrence of an error.

3. A system according to claim 2, wherein
said executable procedure generator automatically generates an environment for said computerized processing system substantially replicating an environment occurring during occurrence of an exception or an event associated with incorrect operation of said computerized processing system.

4. A system according to claim 3, wherein
said executable procedure generator automatically generates said environment for said computerized processing system by associating executable procedures with corresponding workflow tasks in said workflow report and by initiating execution of the executable procedures.

5. A system according to claim 1, wherein
said executable procedure generator generates executable procedures comprising automated test scripts.

6. A system according to claim 1, wherein
said executable procedure generator processes records of the workflow report for automatically generating a computer system environment substantially replicating a computer system environment occurring during performance of the workflow tasks by said user and said system by associating executable procedures with corresponding workflow tasks in said workflow report and by initiating execution of the executable procedures.

7. A system according to claim 6, wherein
said executable procedures associated with said corresponding workflow tasks are executed in sequential order corresponding to the original order of tasks performed by said user and said system in said workflow report.

8. A system according to claim 7, wherein
said executable procedures associated with said corresponding workflow tasks are executed at time intervals substantially corresponding to the original time intervals between tasks performed by said user and said system in said workflow report.

9. A system according to claim 1, wherein said at least one log file includes data identifying time and date stamped actions performed by said user of said computerized processing system and actions performed by said system.

10. A method performed by at least one computerized processing device for automatically generating a workflow report for testing a computerized system and other uses, comprising the activities of:
  generating at least one log file including records identifying time stamped non-test actions performed by a user of a computerized processing system and actions performed by said system;
  automatically parsing records of said at least one log file to identify a sequence of time stamped workflow tasks performed during a time period encompassing an error using predetermined data patterns indicating workflow tasks performed in a workflow by a user and a system;
  automatically generating a workflow report comprising the identified workflow tasks and associated time stamps indicating non-test workflow tasks performed by the system and user during said time period in sequence; and
  using the workflow report for generating executable procedures replicating the identified system and user non-test workflow tasks in said sequence.

11. A method according to claim 10, including the activity of
  using the identified workflow tasks for automatically generating executable procedures for use in substantially replicating computerized processing system and user actions during occurrence of an error.

12. A method according to claim 10, including the activity of
  generating at least one log file including records identifying time stamped actions comprising at least two of, (a) a Process Name, (b) a Process identifier, (c) a Thread identifier, (d) a time of occurrence and (e) a Message describing an action.

13. A system for automatically generating a workflow report for testing a computerized system and other uses, comprising:
  at least one computer including:
    at least one log file including records identifying time stamped non-test actions performed by a user of a computerized processing system and actions performed by said system;
    a repository of stored predetermined data patterns associated with workflow tasks performed in a workflow by a user and a system;
    a parser for automatically parsing records of said at least one log file to identify a sequence of time stamped workflow tasks performed during a time period encompassing an error using the predetermined data patterns;
    a report generator for automatically generating a workflow report comprising the identified workflow tasks and associated time stamps indicating non-test workflow tasks performed by the system and user during said time period in sequence; and
    an executable procedure generator for using the identified workflow tasks for automatically generating executable procedures for use in substantially replicating computerized processing system and user actions in said sequence during occurrence of an error.

14. A system according to claim 13, wherein
said executable procedure generator automatically generates an environment for said computerized processing system substantially replicating an environment occurring during occurrence of an exception or an event associated with incorrect operation of said computerized processing system.

15. A system according to claim 14, wherein
said executable procedure generator automatically generates said environment for said computerized processing system by associating executable procedures with corresponding workflow tasks in said workflow report and by initiating execution of the executable procedures.

* * * * *